(12) United States Patent
Ueda et al.

(10) Patent No.: US 8,062,764 B2
(45) Date of Patent: Nov. 22, 2011

(54) ALUMINUM ALLOY BRAZING SHEET AND ALUMINUM ALLOY TUBE FOR HEAT EXCHANGER

(75) Inventors: Toshiki Ueda, Moka (JP); Akihiro Tsuruno, Moka (JP); Fumihiro Koshigoe, Moka (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 891 days.

(21) Appl. No.: 11/911,290

(22) PCT Filed: Apr. 3, 2006

(86) PCT No.: PCT/JP2006/307031
§ 371 (c)(1),
(2), (4) Date: Feb. 19, 2008

(87) PCT Pub. No.: WO2006/109602
PCT Pub. Date: Oct. 19, 2006

(65) Prior Publication Data
US 2009/0020276 A1   Jan. 22, 2009

(30) Foreign Application Priority Data
Apr. 12, 2005   (JP) ................... 2005-115167

(51) Int. Cl.
*F28F 21/08* (2006.01)
*B32B 15/02* (2006.01)
*B32B 15/20* (2006.01)

(52) U.S. Cl. ......... 428/654; 165/180; 165/905; 138/143

(58) Field of Classification Search .................. None
See application file for complete search history.

(56) References Cited

FOREIGN PATENT DOCUMENTS

| JP | 10 8176 | 1/1998 |
|----|---------|--------|
| JP | 10 53827 | 2/1998 |
| JP | 2005232507 A * | 9/2005 |

OTHER PUBLICATIONS

English Machine Translation of JP 2005-232507, Ozaki et al., Feb. 3, 2011.*
U.S. Appl. No. 12/335,950, filed Dec. 16, 2008, Koshigoe, et al.
U.S. Appl. No. 12/519,023, filed Jun. 12, 2009, Ueda, et al.
U.S. Appl. No. 12/528,807, filed Aug. 27, 2009, Koshigoe, et al.
U.S. Appl. No. 13/037,543, filed Mar. 1, 2011, Ueda, et al.

* cited by examiner

*Primary Examiner* — Jennifer McNeil
*Assistant Examiner* — Adam Krupicka
(74) *Attorney, Agent, or Firm* — Oblon, Spivak, McClelland, Maier & Neustadt, L.L.P.

(57) ABSTRACT

The present invention relates to an aluminum alloy brazing sheet (1) for a heat exchanger improved in a life including a fatigue in a plastic area and an aluminum alloy heat exchanger tube (11) using the brazing sheet, which is composed of: a core material (2) of an Al—Mn series alloy; a skin material (3) of any one of an Al—Zn series alloy, an Al—Zn—Mg series alloy, an Al—Si—Mn—Zn series alloy, and an Al—Si—Mn—Mg—Zn series alloy clad on one side of the core material; and a brazing material (4) of an Al—Si series alloy clad on the other side of the core material, and is adapted so that an X-ray diffraction intensity ratio of the aluminum alloy brazing sheet satisfies a relational expression of $I_{200}/(I_{111}+I_{200}+I_{220}+I_{311}) \geqq 0.4$.

3 Claims, 4 Drawing Sheets

US 8,062,764 B2

ALUMINUM ALLOY BRAZING SHEET AND ALUMINUM ALLOY TUBE FOR HEAT EXCHANGER

TECHNICAL FIELD

The present invention relates to an aluminum alloy brazing sheet used in making a heat exchanger and an aluminum alloy heat exchanger tube configured with such the aluminum alloy brazing sheet.

BACKGROUND ART

A common automobile heat exchanger is configured, as shown in FIG. 4, so that a heat radiation fin 112 processed like a corrugation is integrally formed between planular tubes 111 provided plurally like a radiator 100 and so that both ends of the tubes 111 are respectively opened to a space configured with a header 113 and a tank (not shown).

The radiator 100 of such the configuration sends a refrigerant of a high temperature from a space of one tank to that of the other tank through each inside of the tubes 111 and again circulates the refrigerant that becomes a lower temperature by exchanging heat between the tubes 111 and the heat radiation fin 112.

In the tubes 111, as shown in FIG. 4, cladding one side of a core material 102 with a skin material (also called a sacrificial electrode material) 103, forming an aluminum alloy brazing sheet 101 (see FIG. 5), where the other side of the core material 102 is clad with a brazing material 104, like a planular tube by such a forming roll, and performing electric resistance welding or heating and brazing, whereby the aluminum alloy brazing sheet 101 itself is brazed and liquid paths of the tubes 111 are formed.

Meanwhile, in the core material 102 is used an Al—Mn series alloy such as alloy No. 3003 specified in JIS H 4000 from a view point of an anticorrosion and a strength; in the skin material 103 always contacting a refrigerant are used alloy No. 7072, and Al—Zn series and an Al—Zn—Mg series alloy such as Al-2 to 5% Zn-2 to 4% Mg, and in the brazing material 104 is used an Al—Si series alloy such as alloy No. 4045 of a lower melting point.

The radiator 100 is integrally assembled by brazing, using the tubes 111 configured above, the radiation fin 112 where corrugated processing is performed, and other members. As a brazing method can be cited such a flux brazing method and a Nocolok brazing method of using a noncorrosive flux; and brazing is performed, heating the members described above at a high temperature of approximately 600 degrees Celsius.

In the radiator 100 thus assembled, specifically in the tubes 111, a refrigerant of a high temperature to a low temperature and a high pressure to a normal pressure results in always passing and circulating. In other words, because a repetitive stress is loaded to the tubes 111, a fatigue characteristic for enduring this is requested.

It is generally known that the fatigue characteristic relates to a static tensile strength, and a material where Cu is added is proposed in order to improve the tensile strength of a raw material also in a heat exchanger (for example, see Japanese Patent Laid-Open Publication No. H10-53827 (claims 1 to 4 and paragraph 0013).

DISCLOSURE OF THE INVENTION

However, in these years a weight of an automobile is saved from a request of an energy saving and a pollution countermeasure, and also in a heat exchanger material such as the radiator 100, further thinning the material is progressing. On the other hand, a refrigerant pressure used is set higher than conventionally in many cases.

Thus although it becomes a severer condition for an automobile heat exchanger such as the radiator 100, it is requested to improve a fatigue life of the automobile heat exchanger.

Under such the situation, in order to improve the fatigue life of the automobile heat exchanger, although it is considered also in a target fatigue characteristic of a heat exchanger material that it is important to improve: not only a fatigue life indicated under a repetitive stress resulting in a breakage with a load stress in an elastic area of the material as conventionally used in common; but also a life including a fatigue under such a repetitive stress that the material results in a plastic area with further increasing a strain amount, there are many unknown points with respect to a measure for improving the life including the fatigue in such the plastic area.

The present invention is performed in view of the problem and makes it a problem to provide an aluminum alloy brazing sheet for a heat exchanger, of which a life is improved including a fatigue in a plastic area, and an aluminum alloy heat exchanger tube configured with using the same.

An aluminum alloy brazing sheet for a heat exchanger of the present invention having solved the problem is composed of: a core material of an Al—Mn series alloy; a skin material of any one of an Al—Zn series alloy, an Al—Zn—Mg series alloy, an Al—Si—Mn—Zn series alloy, and an Al—Si—Mn—Mg—Zn series alloy clad on one side of the core material; and a brazing material of an Al—Si series alloy clad on the other side of the core material, wherein an X-ray diffraction intensity ratio of the brazing sheet satisfies a relational expression of $I_{200}/(I_{111}+I_{200}+I_{220}+I_{311}) \geq 0.4$.

Thus the aluminum alloy brazing sheet of the present invention satisfies the relational expression, and thereby can make it easier to uniformly generate a plastic deformation in a direction parallel with a rolling direction of the brazing sheet in a deformation in a plastic area. As the result, because the deformation does not locally concentrate and a progress of a crack in a thickness direction can be delayed, it is enabled to improve a life including a fatigue in the plastic area.

In addition, an aluminum alloy heat exchanger tube of the present invention having solved the problem is configured to use an aluminum alloy brazing sheet composed of: a core material of an Al—Mn series alloy; a skin material of any one of an Al—Zn series alloy, an Al—Zn—Mg series alloy, an Al—Si—Mn—Zn series alloy, and an Al—Si—Mn—Mg—Zn series alloy clad on one side of the core material; and a brazing material of an Al—Si series alloy clad on the other side of the core material, wherein the skin material is disposed on an inner face of the heat exchanger tube and an X-ray diffraction intensity ratio of the heat exchanger tube after being heated at a temperature of 585 to 620 degrees Celsius satisfies a relational expression of $I_{200}/(I_{111}+I_{200}+I_{220}+I_{311}) \geq 0.3$.

Thus the aluminum alloy heat exchanger tube of the present invention satisfies the relational expression, and thereby therein, it becomes easier for a plastic deformation to be uniformly generated in a direction parallel with a rolling direction of an aluminum alloy brazing sheet in a deformation in a plastic area. As the result, because even when a tensile or compressive repetitive stress is loaded in a rolling direction, a deformation does not locally concentrate and a progress of a crack in a thickness direction can be delayed, it is enabled to improve a life including a fatigue in the plastic area.

An aluminum alloy brazing sheet for a heat exchanger related to the present invention can improve a life including a fatigue in a plastic area. Thus it is enabled to improve a fatigue life of an automobile heat exchanger.

In addition, an aluminum alloy heat exchanger tube related to the present invention can improve a life including a fatigue in a plastic area. Thus it is enabled to improve the fatigue life of the automobile heat exchanger.

BEST MODE FOR CARRYING OUT THE INVENTION

Next will be described a best mode for carrying out an aluminum alloy brazing sheet for a heat exchanger of the present invention and an aluminum alloy heat exchanger tube thereof, referring to drawings as needed.

Figure 1:
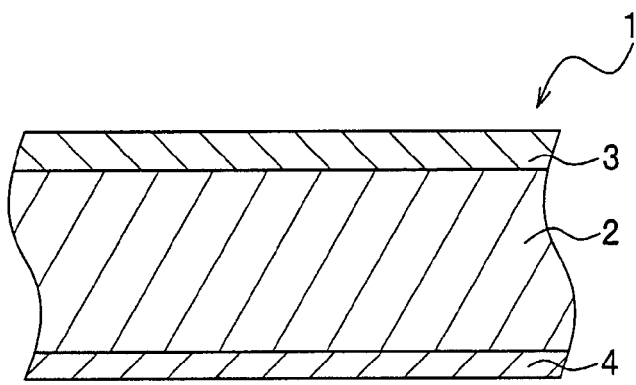
FIG. 1 is a section view of an aluminum alloy brazing sheet for a heat exchanger of the present invention.
Figure 2:
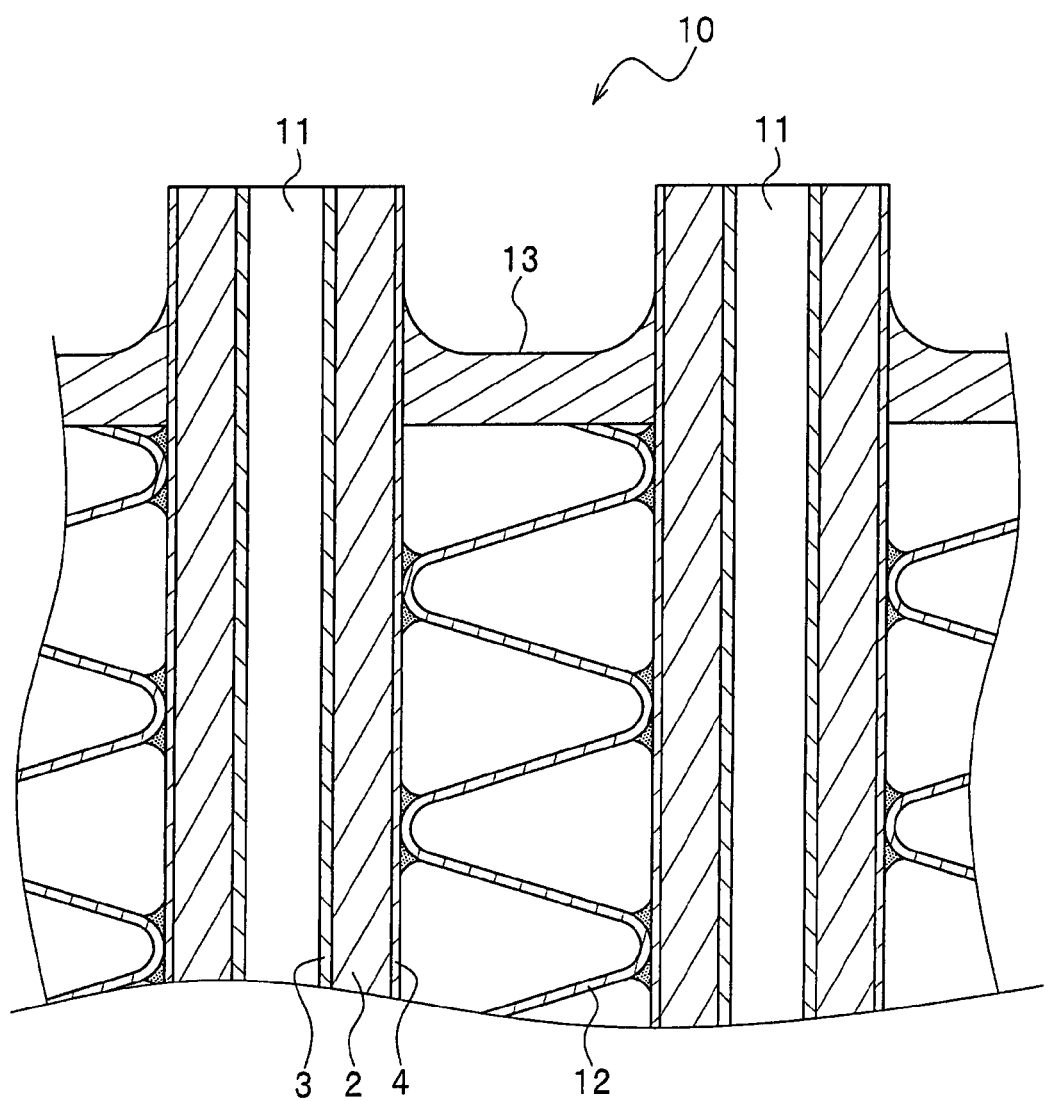
FIG. 2 is a section view of a main part of an automobile heat exchanger where an aluminum alloy brazing sheet (aluminum alloy heat exchanger tube) for a heat exchanger of the present invention is used.

In referred drawings FIG. 1 is a section view of an aluminum alloy brazing sheet for a heat exchanger of the present invention; FIG. 2 is a section view of a main part of an automobile heat exchanger where an aluminum alloy brazing sheet (aluminum alloy heat exchanger tube) for a heat exchanger of the present invention is used.

[Aluminum Alloy Brazing Sheet for Heat Exchanger]

An aluminum alloy brazing sheet 1 for a heat exchanger of the present invention is, as shown in FIG. 1, composed of: a core material 2 of an Al—Mn series alloy; a skin material 3 of any one of an Al—Zn series alloy, an Al—Zn—Mg series alloy, an Al—Si—Mn—Zn series alloy, and an Al—Si—Mn—Mg—Zn series alloy clad on one side of the core material 2; and a brazing material 4 of an Al—Si series alloy clad on the other side of the core material 2.

In addition, the aluminum alloy brazing sheet 1 is adapted so that an X-ray diffraction intensity ratio thereof satisfies a relational expression of $I_{200}/(I_{111}+I_{200}+I_{220}+I_{311}) \geq 0.4$.

Here, ($I_{200}$, $I_{111}$, $I_{220}$, $I_{311}$) respectively express X-ray diffraction intensities in equivalent face groups {200}, {111}, {220}, and {311} in Minor Index.

Normally, in a case that an X-ray diffraction intensity is measured by a θ-2θ method in Al (same in Au, Cu, Ni, Ag, and the like) normally having a crystal lattice of a face-centered cubic lattice, because diffractions are generated between equivalent face groups {111}, {200}, {220}, {311}, {222}, {400}, {331}, and {420} from a smaller angle of an angle (2θ) and each crystal face, an X-ray diffraction intensity ratio of {200} to four X-ray diffraction intensities of lower order indices (first four) summed up is calculated.

In other words, in the aluminum alloy brazing sheet 1 are measured X-ray diffraction intensities of the respective face groups, is derived a summation of the X-ray diffraction intensities ($I_{200}$, $I_{111}$, $I_{220}$, $I_{311}$) of the respective face groups of the measured {200}, {111}, {220}, and {311} as shown in an equation (1) below and the ratio of the X-ray diffraction intensity of the {200} to the summation is assumed to be the X-ray diffraction intensity ratio:

$$I_{200}/(I_{111}+I_{200}+I_{220}+I_{311}) \geq 0.4. \qquad \text{Eq. (1)}$$

In the present invention it is requested for the X-ray diffraction intensity ratio to be not less than 0.4. Meanwhile, an X-ray diffraction intensity can be measured with a multipurpose X-ray diffractometer.

If the X-ray diffraction intensity ratio is not less than 0.4, a plastic deformation can be uniformly generated in a direction parallel with a rolling direction of the aluminum alloy brazing sheet 1; as the result, because even when a tensile or compressive repetitive stress is loaded in the rolling direction, a deformation does not locally concentrate and a progress of a crack in a thickness direction can be delayed, it is enabled to improve a life including a fatigue in a plastic area. On the other hand, if the X-ray diffraction intensity ratio is less than 0.4, the effect cannot be obtained.

Accordingly, the X-ray diffraction intensity ratio of the aluminum alloy brazing sheet 1 of the present invention is assumed to be not less than 0.4.

Thus because if the equation (1) is satisfied, {100} of an aluminum alloy can be made to be strongly oriented in parallel with a sheet surface, it can be made easier to uniformly generate a plastic deformation in a direction parallel with a rolling direction of an aluminum alloy brazing sheet in a deformation in a plastic area.

In other words, because it is enabled to simultaneously energize a plurality of slip faces by strongly orienting {100} in parallel with a sheet surface, a deformation does not locally concentrate and a progress of a crack in a thickness direction can be delayed.

The core material 2 of the aluminum alloy brazing sheet 1 of such the present invention is composed of an Al—Mn series alloy as described above. However, the core material 2 usable in the present invention is not limited thereto, an Al—Mn series-alloy containing any of Cu and Si is also usable; furthermore, an Al—Mn series alloy containing 0.2 to 0.8 mass % of Mg; and an Al—Mn series alloy further containing 0.2 to 0.8 mass % of Mg, and additionally any of Cu and Si. In addition, as needed, between the brazing material 4 and the core material 2 or between the core material 2 and the skin material 3 is also usable an aluminum alloy provided with an intermediate layer (not shown) not containing Mg.

In addition, the skin material 3 of the aluminum alloy brazing sheet 1 of the present invention is composed of any one of an Al—Zn series alloy, an Al—Zn—Mg series alloy, an Al—Si—Mn—Zn series alloy, and an Al—Si—Mn—Mg—Zn series alloy as described above. However, the skin material 3 usable in the present invention is not limited thereto; any one of an Al—Zn series alloy, an Al—Zn—Mg series alloy, an Al—Si—Mn—Zn series alloy, and an Al—Si—Mn—Mg—Zn series alloy containing any of In and Sn is also usable.

As a preferable composition range used in the skin material 3 can be cited, for example, Al-2.5 to 5.5 mass % Zn, Al-0.2 to 1.2 mass % Si-0.1 to 1.5 mass % Mn-2.5 to 5.5 mass % Zn, Al-0.2 to 1.2 mass % Si-0.2 to 3.5 mass % Mg-1.5 to 5.5 mass % Zn, and the like. Although a thickness of the skin material 3 is not specifically limited, it is normally 30 to 100 μm.

In addition, the brazing material 4 of the aluminum alloy brazing sheet 1 of the present invention is composed of an Al—Si series alloy as described above. However, the brazing material 4 usable in the present invention is not limited thereto; and an Al—Si series alloy containing any of Cu, Zn, and the like lower in melting point is also usable.

In addition, in the aluminum alloy brazing sheet 1 of the present invention, after respectively disposing the skin material 3 and the brazing material 4 on one side and the other side of the core material 2 and performing a homogenization treatment for the brazing sheet 1, it is enabled to manufacture the brazing sheet 1 by performing: hot rolling and cladding; intermediate annealing at a temperature of 210 to 300 degrees Celsius as needed; and finish cold rolling at a cold reduction ratio not less than 5% and less than 22%.

[Aluminum Alloy Heat Exchanger Tube]

Next will be described an aluminum alloy heat exchanger tube.

An aluminum alloy heat exchanger tube 11 like a planular tube of the present invention is obtained as shown in FIG. 2 by: making the aluminum alloy brazing sheet 1 with the core material 2 of an Al—Mn series alloy, the skin material 3 of any one of an Al—Zn series alloy, an Al—Zn—Mg series alloy, an Al—Si—Mn—Zn series alloy, and an Al—Si—Mn—Mg—Zn series alloy on one side of the core material 2, and the brazing material 4 of an Al—Si series alloy clad on the other side thereof; curvedly bending the brazing sheet 1 in a width direction by such a forming roll; forming the brazing sheet 1 like the planular tube so that the skin material 3 is disposed on an inner face of the tube; thereafter welding it by electric resistance welding; and making it the tube like the planular tube.

In addition, the aluminum alloy heat exchanger tube 11 is integrally assembled by blazing, with using the radiator fin 12 and other members such as the header 13, and can be made into a heat exchanger such as the radiator 100 by being heated at a high temperature of 585 to 620 degrees Celsius, preferably 590 to 600 degrees Celsius and being blazed.

Here, because a solidus temperature of the brazing material 4 is 577 degrees Celsius, blazing cannot be performed at a temperature lower than this. Accordingly, it is assumed that the heating temperature is not less than 585 degrees Celsius, preferably not less than 590 degrees Celsius. On the other hand, if the heating temperature exceeds 620 degrees Celsius, an excessive melting and an erosion are generated. Accordingly, it is assumed that the heating temperature in the present invention is not more than 620 degrees Celsius.

In addition, in the aluminum alloy heat exchanger tube 11 it is requested for an X-ray diffraction intensity ratio to satisfy an equation (2) below when brazing is performed at a temperature of 585 to 620 degrees Celsius:

$$I_{200}/(I_{111}+I_{200}+I_{220}+I_{311}) \geqq 0.3.$$ Eq. (2)

If the X-ray diffraction intensity ratio is less than 0.3 when heating corresponding to brazing is performed at a temperature of 585 to 620 degrees Celsius, it is difficult to uniformly generate a plastic deformation in a direction parallel with a rolling direction of the aluminum alloy heat exchanger tube 11. As the result, in a case that a tensile or compressive repetitive stress is loaded in the rolling direction, because a deformation locally concentrates and a progress of a crack in a thickness direction cannot be delayed, it is not enabled to improve a life including a fatigue in a plastic area.

Accordingly, it is assumed that the X-ray diffraction intensity ratio of the aluminum alloy heat exchanger tube 11 of the present invention is not less than 0.3.

In order to realize the X-ray diffraction intensity ratio defined in the present invention, for example, an aluminum alloy composition and manufacturing condition (casting condition, homogenization treatment condition, intermediate annealing condition) of a core material and a skin material may be appropriately adjusted.

EXAMPLE

Hereafter will be concretely described an aluminum alloy brazing sheet for a heat exchanger related to the present invention, contrasting an example satisfying a requested condition defined by the invention and a comparison example not satisfying the requested condition defined by the invention.

With respect to specimens A, B, and C, a same composition was used.

As a core material of the specimens A, B, and C is used an aluminum alloy containing: Si, 0.81 mass %; Fe, 0.18 mass %; Cu, 0.82 mass %; Mn, 1.5 mass %; Mg, 0.04 mass %; Ti, 0.12; and Al, balance.

As a skin material of the specimens A, B, and C is used an aluminum alloy containing: Si, 0.79 mass %; Mn, 1.1 mass %; Zn, 4.0 mass %; and Al, balance.

In addition, as a brazing material of the specimens A, B, and C is used an aluminum alloy containing Si, 10.5 mass %, and Al, balance.

Casting (temperature 680 to 750 degrees Celsius for the core material, the skin material, and the brazing material) the specimens A, B, and C having such the composition according to a common procedure, then performing a homogenization treatment (for example, 450 to 590 degrees Celsius×10 hours for the core material and the skin material; and 450 to 520 degrees Celsius×10 hours for the brazing material), further performing hot rolling and cladding (a temperature not less than 400 degrees Celsius; a thickness of finish hot rolling, 3 mm), performing an intermediate annealing (temperature shown in Table 1) as needed, performing finish cold rolling at a finish cold reduction ratio in Table 1, and thereby aluminum alloy brazing sheets (flat sheet specimens A, B, and C) for a heat exchanger of a three-layer structure of each thickness 0.2 mm were made.

TABLE 1

| | Finish Cold Reduction Ratio (%) | Intermediate Annealing Temperature (degree Celsius) |
|---|---|---|
| Specimen A | not less than 5 to less than 22 | 210 to 300 |
| Specimen B | not less than 22 to less than 80 | 300 to 400 |
| Specimen C | not less than 22 to less than 80 | 210 to 300 |

Using the specimens A, B, and C thus made were performed evaluations of: (a) a tensile strength after heating corresponding to brazing, (b) X-ray diffraction intensity ratios before and after the heating corresponding to the brazing, and (c) a breakage repetition number (fatigue life) after the heating corresponding to the brazing.

(a) Tensile Strength After Heating Corresponding to Brazing:

Firstly, the specimens A, B, and C were heated to a temperature (600 degrees Celsius) where brazing was performed. Cutting out JIS 15 test pieces from the heated specimens A, B, and C so that a tensile direction became parallel with a rolling direction and performing a tensile test according to JIS Z 2241, each tensile strength was measured.

(b) X-ray Diffraction Intensity Ratio Before and After Heating Corresponding to Brazing:

Using the specimens A, B, and C before and after being heated to a temperature (600 degrees Celsius) where brazing was performed, an X-ray diffraction intensity was measured.

Using an X-ray diffractometer (RAD-B System manufactured by Rigaku Corp.) and entering an X-ray in a plane, which is vertical to a rolling plane and where an intersecting line between the plane and the rolling plane becomes parallel with a rolling direction, from a skin material side, the X-ray diffraction intensities $I_{111}$, $I_{200}$, $I_{220}$, and $I_{311}$ of the equivalent face groups {111}, {200}, {220}, and {311} were measured by the θ-2θ method.

In addition, using the X-ray diffraction intensities $I_{111}$, $I_{200}$, $I_{220}$, and $I_{311}$ of the measured specimens A, B, and C before being heated, each X-ray diffraction intensity ratio I of the specimens A, B, and C before being heated was calculated according to an equation (3):

$$I = I_{200}/(I_{111} + I_{200} + I_{220} + I_{311}).\qquad \text{Eq. (3)}$$

A case was determined excellent (○) that the X-ray diffraction intensity I of the specimens A, B, and C derived according to the equation (3) was not less than 0.4; a case was determined bad (x) that the X-ray diffraction intensity I of the specimens A, B, and C derived according to the equation (3) was less than 0.4.

In addition, using the X-ray diffraction intensities $I_{111}$, $I_{200}$, $I_{220}$, and $I_{311}$ of the measured specimens A, B, and C after being heated, each X-ray diffraction intensity ratio I' of the specimens A, B, and C after being heated was calculated according to an equation (4):

$$I' = I_{200}/(I_{111} + I_{200} + I_{220} + I_{311}).\qquad \text{Eq. (4)}$$

A case was determined excellent (○) that the X-ray diffraction intensity I' of the specimens A, B, and C derived according to the equation (4) was not less than 0.3; a case was determined bad (x) that the X-ray diffraction intensity I' of the specimens A, B, and C derived according to the equation (3) was less than 0.3.

(c) Breakage Repetition Number (Fatigue Life) After Heating Corresponding to Brazing.

Figure 3:
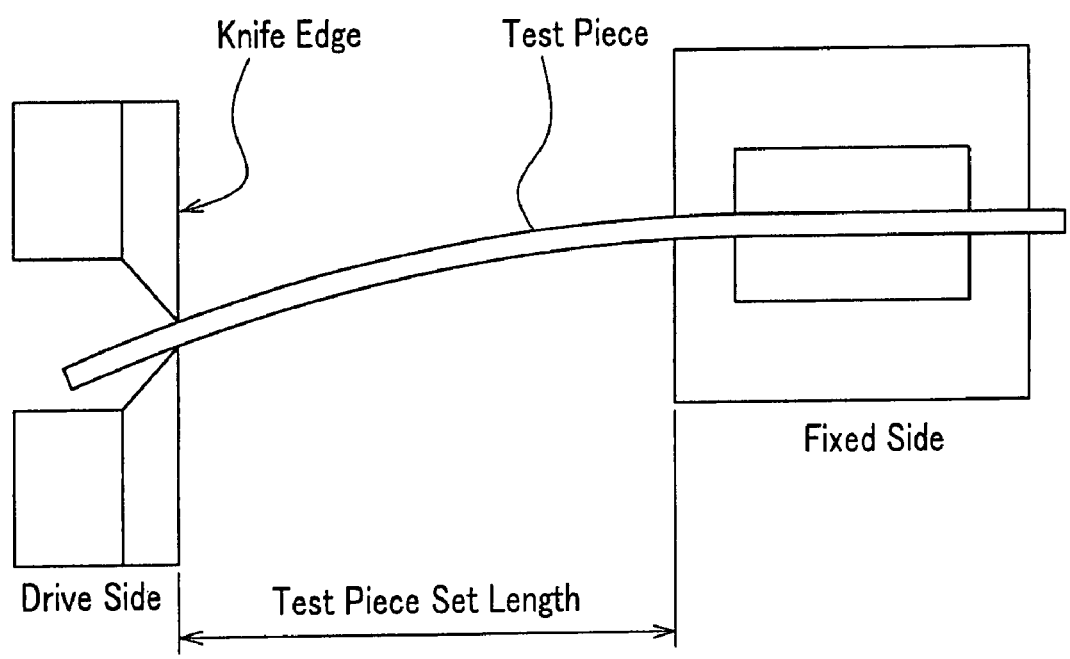
FIG. 3 is an illustration drawing illustrating a pulsating plane bending fatigue test.
Figure 4:
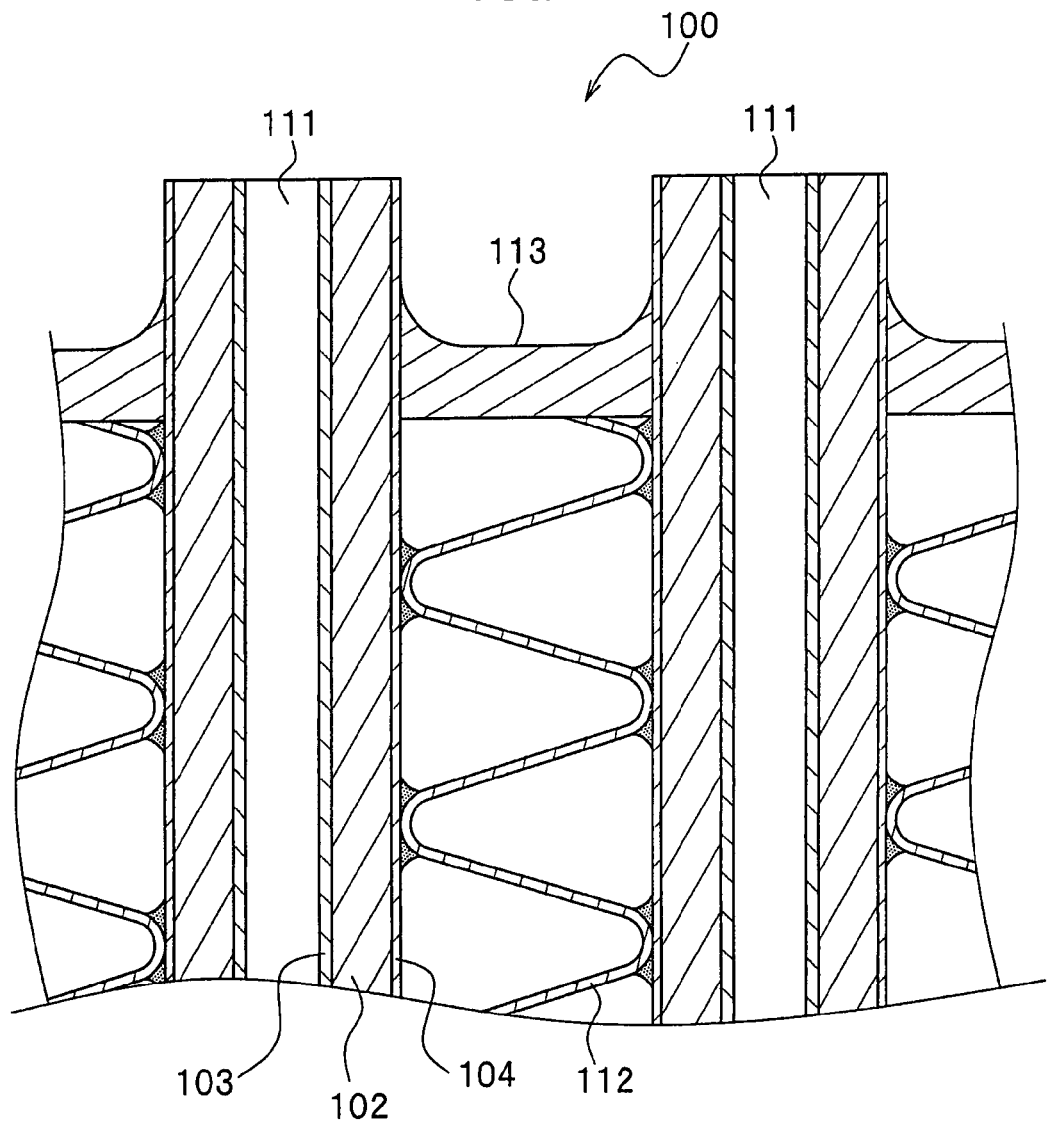
FIG. 4 is a section view of a main part of a conventional common automobile heat exchanger.
Figure 5:
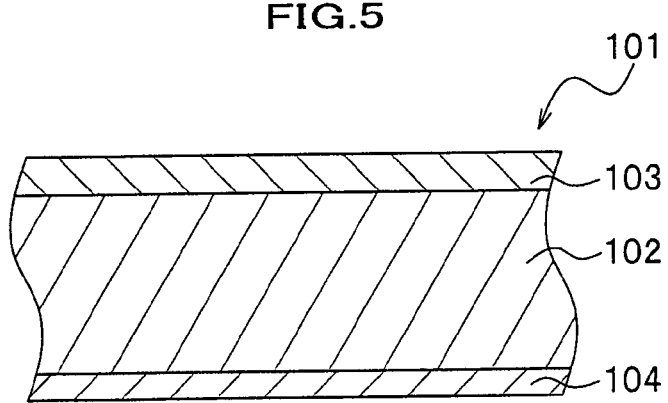
FIG. 5 is a section view of an aluminum alloy brazing sheet for a conventional heat exchanger.
Figure 6:
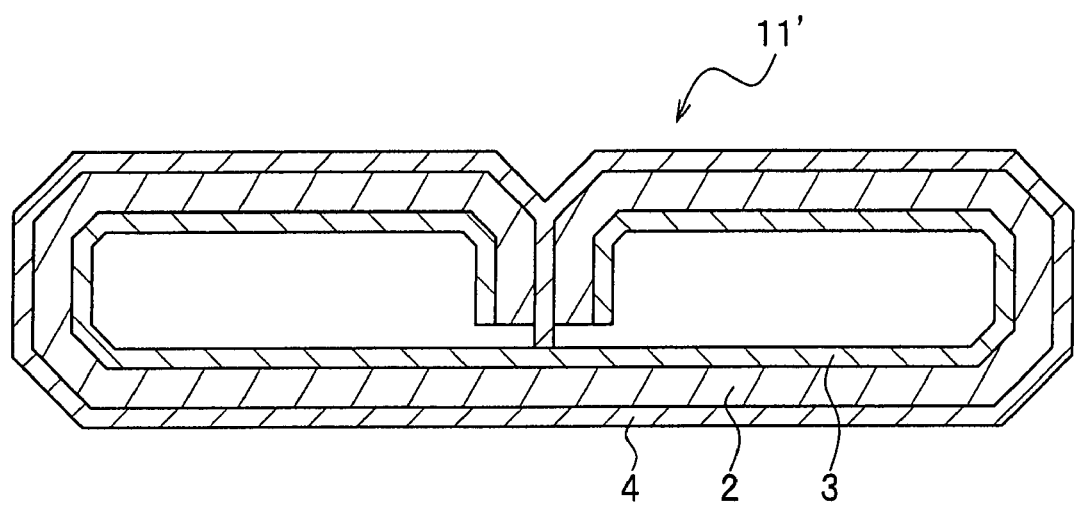
FIG. 6 is a section view of an aluminum alloy tube for a heat exchanger of the present invention.

A breakage repetition number was derived according to a pulsating plane bending fatigue test shown in FIG. 3. Meanwhile, FIG. 3 is an illustration drawing illustrating the pulsating plane bending fatigue test.

Cutting out and making test pieces of 10 mm×60 mm×thickness from the flat sheet specimens A, B, and C after being heated to the temperature (600 degrees Celsius) where brazing was performed, so as to become parallel with a rolling direction, one end of such each test piece was fixed on a fixed side of a pulsating plane bending fatigue testing machine. Then pinching the other end of the test piece with a knife edge at a drive side and moving a position of the knife edge, whereby changing a test piece set length, a test was performed so that a pulsating width became constant (5 mm in up/down directions in FIG. 3). At this time, with respect to an additional bending stress, the test piece set length was adjusted so that a strain amount of a breakage region became around maximum 0.008. Under such the condition the repetition number till a breakage of each test piece of the specimens A, B, and C was derived.

Meanwhile, with respect to the strain amount of the breakage region, because strain gauges cannot directly be affixed thereto, they were affixed to two to three predetermined positions slightly separate from the breakage region, the strain amount was estimated by interpolating the strain amount of the breakage region from a strain value of each strain gauge in each test piece length, and based on this, a load stress, that is, the test piece set length, was adjusted.

A measurement result of the above mentioned (a) a tensile strength after heating corresponding to brazing, (b) X-ray diffraction intensity ratios before and after the heating corresponding to the brazing, and (c) a breakage repetition number (fatigue life) after the heating corresponding to the brazing is shown in Table 2.

TABLE 2

| | Tensile Strength After Heating Corresponding to Brazing [MPa] | X-ray Diffraction Intensity Ratio Before Heating Corresponding to Brazing $I_{200}/(I_{111} + I_{200} + I_{220} + I_{311})$ | X-ray Diffraction Intensity Ratio After Heating Corresponding to Brazing $I_{200}/(I_{111} + I_{200} + I_{220} + I_{311})$ | Breakage Repetition Number After Heating Corresponding to Brazing | Remark |
|---|---|---|---|---|---|
| Specimen A | 170 | 0.44 (○) | 0.67 (○) | 10200 | Example |
| Specimen B | 175 | 0.35 (x) | 0.08 (x) | 8600 | Comparison Example |
| Specimen C | 173 | 0.27 (x) | 0.22 (x) | 8500 | Comparison Example |

As seen from Table 2, the specimens A, B, and C have approximately same tensile strengths (170 to 175 MPa).

Specifically, because in the specimen A were proper not only the composition and manufacturing condition of each aluminum alloy of the core material, the skin material, and the brazing material but also the X-ray diffraction intensity ratios before and after the heating corresponding to the brazing, a favorable evaluation result could be obtained in an evaluation item of the breakage repetition number corresponding to the brazing.

In other words, because a deformation did not locally concentrate and the progress of a crack in a thickness direction could be delayed, the life (breakage repetition number in a strain amount of 0.008) including a fatigue in a plastic area was improved.

On the other hand, because although in the specimens B and C was proper the composition of each aluminum alloy of the core material, the skin material, and the brazing material, the manufacturing condition was improper and furthermore the X-ray diffraction intensity ratios before and after the heating corresponding to the brazing were improper, the breakage repetition numbers corresponding to the brazing were less and a favorable evaluation result could not be obtained.

To be more precise, because the specimen B was higher in finish cold reduction ratio and intermediate annealing temperature, the X-ray diffraction intensity ratios before and after the heating corresponding to the brazing became lower. Therefore, it was difficult in the deformation of a plastic area by repetitive bending to uniformly generate the plastic deformation in a direction parallel with a rolling direction of the specimen B.

In other words, because the deformation locally concentrated and the progress of a crack in a thickness direction could not be delayed, the life (breakage repetition number in a strain amount of 0.008) including a fatigue in a plastic area was not improved.

Similarly, because the specimen C was higher in finish cold reduction ratio, the X-ray diffraction intensity ratios before and after the heating corresponding to the brazing became lower. Therefore, it was difficult in the deformation of a plastic area by repetitive bending to uniformly generate the plastic deformation in a direction parallel with a rolling direction of the specimen C.

In other words, because the deformation locally concentrated and the progress of a crack in a thickness direction could not be delayed, the life (breakage repetition number in a strain amount of 0.008) including a fatigue in a plastic area was not improved.

What is claimed is:

1. An aluminum alloy brazing sheet for a heat exchanger comprising:
   a core material of an Al—Mn series alloy;
   a skin material of any one of an Al—Zn series alloy, an Al—Zn—Mg series alloy, an Al—Si—Mn—Zn series alloy, and an Al—Si—Mn—Mg—Zn series alloy clad on one side of the core material; and
   a brazing material of an Al—Si series alloy clad on the other side of the core material,
   wherein an X-ray diffraction intensity ratio of the aluminum alloy brazing sheet satisfies a relational expression of $I_{200}/(I_{111}+I_{200}+I_{220}+I_{311}) \geq 0.4$.

2. The aluminum alloy brazing sheet according to claim 1, wherein an intermediate layer not containing Mg is between the core material and the brazing material.

3. An aluminum alloy heat exchanger tube comprising:
   an aluminum alloy brazing sheet composed of: a core material of an Al—Mn series alloy; a skin material of any one of an Al—Zn series alloy, an Al—Zn—Mg series alloy, an Al—Si—Mn—Zn series alloy, and an Al—Si—Mn—Mg—Zn series alloy clad on one side of the core material; and a brazing material of an Al—Si series alloy clad on the other side of the core material,
   wherein the skin material is disposed on an inner face of the tube and an X-ray diffraction intensity ratio of the tube after being heated at a temperature of 585 to 620 degrees Celsius satisfies a relational expression of $I_{200}/(I_{111}+I_{200}+I_{220}+I_{311}) \geq 0.3$.

* * * * *